United States Patent [19]
Anderson

[11] Patent Number: 5,142,579
[45] Date of Patent: Aug. 25, 1992

[54] PUBLIC KEY CRYPTOGRAPHIC SYSTEM AND METHOD

[76] Inventor: Walter M. Anderson, 64 Wildwood Rd., Bedford, Mass. 01730

[21] Appl. No.: 647,447

[22] Filed: Jan. 29, 1991

[51] Int. Cl.⁵ .......................... H04K 1/00; H04L 9/02
[52] U.S. Cl. ...................................... 380/30; 380/21; 380/43; 380/45; 380/46
[58] Field of Search .................. 380/21, 30, 43, 45, 380/46

[56] References Cited

U.S. PATENT DOCUMENTS

| | | | |
|---|---|---|---|
| 4,949,379 | 8/1990 | Cordell | 380/30 |
| 5,020,105 | 5/1991 | Rosen et al. | 380/30 |
| 5,054,066 | 10/1991 | Riek et al. | 380/30 |
| 5,073,934 | 12/1991 | Matyas et al. | 380/30 |

Primary Examiner—Stephen C. Buczinski
Attorney, Agent, or Firm—George Grayson

[57] ABSTRACT

A public key cryptographic system and method includes an insecure communications channel connecting at least two communicating complexes, a sender and a receiver. The sender possesses an encoding device and the receiver possesses a decoding device. The sender uses a public key that may be known by an unauthorized receiver and that is generated by random processes known only to the receiver to encrypt a plain text destined for the receiver. The transformation of plain text to encrypted text using the public key is easily performed, but the inversion of that transformation using only the public key information and the knowledge of the operations of encryption and decryption is extremely difficult and computationally infeasible. The receiver uses the knowledge of the randomly generated transformation set components (the private key) to easily and incrementally invert the encrypted text and recover the plain text. The inversion of the encryption process using the public key is known to be computationally "hard" and an NP-complete problem.

12 Claims, 8 Drawing Sheets

$$Y = M*X + A \cdot SI(X) \cdot SJ(X) + C$$

PUBLIC KEY CRYPTOGRAPHIC SYSTEM AND METHOD

FIELD OF INVENTION

The invention relates to cryptographic systems that are based on encryption and decryption keys that are in two parts: a public key known to all, including the sender of a message to be encrypted, and a private key known only to the receiver of the encrypted message.

DESCRIPTION OF THE PRIOR ART

In today's computationally intensive and communications connected world, cryptographic methods are important in both military and commercial applications for assuring secure and authenticated communications. Security in a system assures that only the intended receiver can decipher an encrypted message and authenticity assures the receiver that it came from the purported sender.

Prior to the mid 1970's it was believed that secure data communications required the use of secret encryption keys known only to the sender and the receiver.(- The Data Encryption Standard (DES) is such a system: see Federal Register, Mar. 17, 1975, Volume 40, No. 52 and Aug. 1, 1975, Volume 40, No. 149). In such a system, if N users are to communicate securely, $N*(N-1)/2$ sets of secret key pairs are required. All key sets are communicated by a secure channel such as a trusted courier. If any key is compromised, secure communications can be re-established only by redistributing $N-1$ keys by a secure channel.

In a seminal paper in 1976 (see Diffie, et al) it was suggested that secure, authenticated communications could be obtained through the use of "trap door" mathematical functions. These functions are "easy" to compute in a forward direction and "hard" to compute in a reverse direction, but they are "easy" to compute in the reverse direction using some side information (the private key). A Public Key Encryption system uses encryption/decryption keys that are in two parts (the public key and the private key) where the public key is distributed over insecure channels.

The most secure encryption systems rely on one-time ciphers. As shown by Shannon (see reference), the potential cryptanalyst does not have enough information to decipher the encrypted text. With public key "trap-door" functions, the potential cryptanalyst is assumed to have all the information required, but does not have enough time to decipher the encrypted text. It is generally accepted that a cryptanalyst is limited to a number of operations between $2^{50}$ and $2^{60}$ and a number of memory locations between $2^{25}$ and $2^{35}$ (see Seberry, et al, page 6).

The most widely used and trusted public key encryption system is the RSA system (U.S. Pat. No. 4,405,829). In more than a decade of use, it has never been known to be compromised. However, there are reasons to consider that it may be vulnerable, especially in the future. The factoring of large numbers (the "trap door" function which is the basis of RSA) has never been shown to be an NP-complete ("hard") mathematical problem and recent efforts have attacked ever larger composite numbers with increasingly more efficient factoring algorithms. In 1982, a team of mathematicians at Sandia Laboratories succeeded in factoring a number of 69 digits using a Cray supercomputer. Previously, it was estimated that a Cray would require millions of years to factor a number of more than 50 digits (see Gardner, page 197).

Other public key encryption systems, proposed and patented, suffer from proved insecurity. Moreover, the patented RSA system is very difficult to compute, especially as the coding block size increases. Even hardware implementations are quite slow, being limited to a few thousand bits per second. Software implementations are limited to hundreds of bits per second or less. (See Brassard, page 31).

SUMMARY AND OBJECTS OF THE INVENTION

Accordingly, it is an object of the invention to provide an improved Public Key Crytographic System and Method.

It is another object of the invention to provide a more secure Public Key Cryptographic System and Method.

It is still another object of the invention to provide an improved implementation of the Public Key Cryptographic System and Method.

It is yet another object of the invention to provide a higher performance implementation of the Public Key Cryptographic System and Method.

It is still another object of the invention to provide a lower cost implementation of the Public Key Cryptographic System and Method.

The embodiment of the present invention describes a method and apparatus for communicating a plain text securely over an insecure communications channel by means of a public key encryption device at a sender using the public key of the receiver. It is infeasible to invert the ciphertext created by the public key encryption device without the private key of the receiver. After transmission over the insecure communications channel, the receiver recovers the plain text as the inversion of the private key encryption using side information, the private key.

Another embodiment of the present invention describes a method and apparatus for communicating a plain text securely over an insecure communications channel and with authentication of the sender by means of encryption at the sender in two parts: (1) encryption of the plain text with the inversion of the private key of the sender in a private key encryption device to create an intermediate encryption and (2) encryption of the intermediate encryption by means of a public key encryption device using the public key of the receiver. After transmission over the insecure communications channel, the receiver recovers the plain text from the ciphertext in two parts: (1) decrypting the ciphertext to the intermediate encryption with the inversion of the private key of the receiver in a private key encryption device and (2) decryption of the intermediate encryption to recover the plain text with a public key encryption device using the public key of the sender. Communications is secure because only the receiver possessing the private key of the receiver can recover the intermediate encryption and it is authenticated because only the sender possessing the private key of the sender can create the intermediate encryption that is transformed into a meaningful plain text using the public key of the sender.

Private keys in the present invention are created as a multiplicity of transformation stages including the operations of linear matrix multiplication with a vector, vector multiplication, vector addition, vector subtraction and permutation of vectors all in a manner that allows the inversion of each transformation stage. All of the operations are performed with arithmetical addition, substraction and multiplication modulo a prime number, P. When P=2 is chosen, the preferred embodiment, addition, substraction, and multiplication modulo the prime reduce to logical XOR, logical XOR, and logical AND respectively.

Public keys in the present invention are created by solving the multiplicity of the transformation stages of the private key symbolically in terms of the variables of the input plain text vector and reducing by algebraic operations on the resulting non-linear polynomial equation set of the public key. The transformation of the private key into a symbolic representation effectively hides the individual transformations of the private key leaving the potential cryptanalyst with the very hard problem of inverting a number of non-linear equations equal to the coding block size. For the choice of prime P=2 at least, the solution of these equations is an NP-complete problem as noted elsewhere.

BRIEF DESCRIPTION OF THE DRAWINGS

The novel features which are believed to be characteristic of the invention both as to its organization and method of operation, together with further objects and advantages will be better understood from the following description when considered in connection with the accompanying drawings. It is expressly understood, however, that each of the drawings is given for the purpose of illustration and description only and is not intended as a definition of the limits of the present invention.

DESCRIPTION OF THE PREFERRED EMBODIMENT

Figure 1:
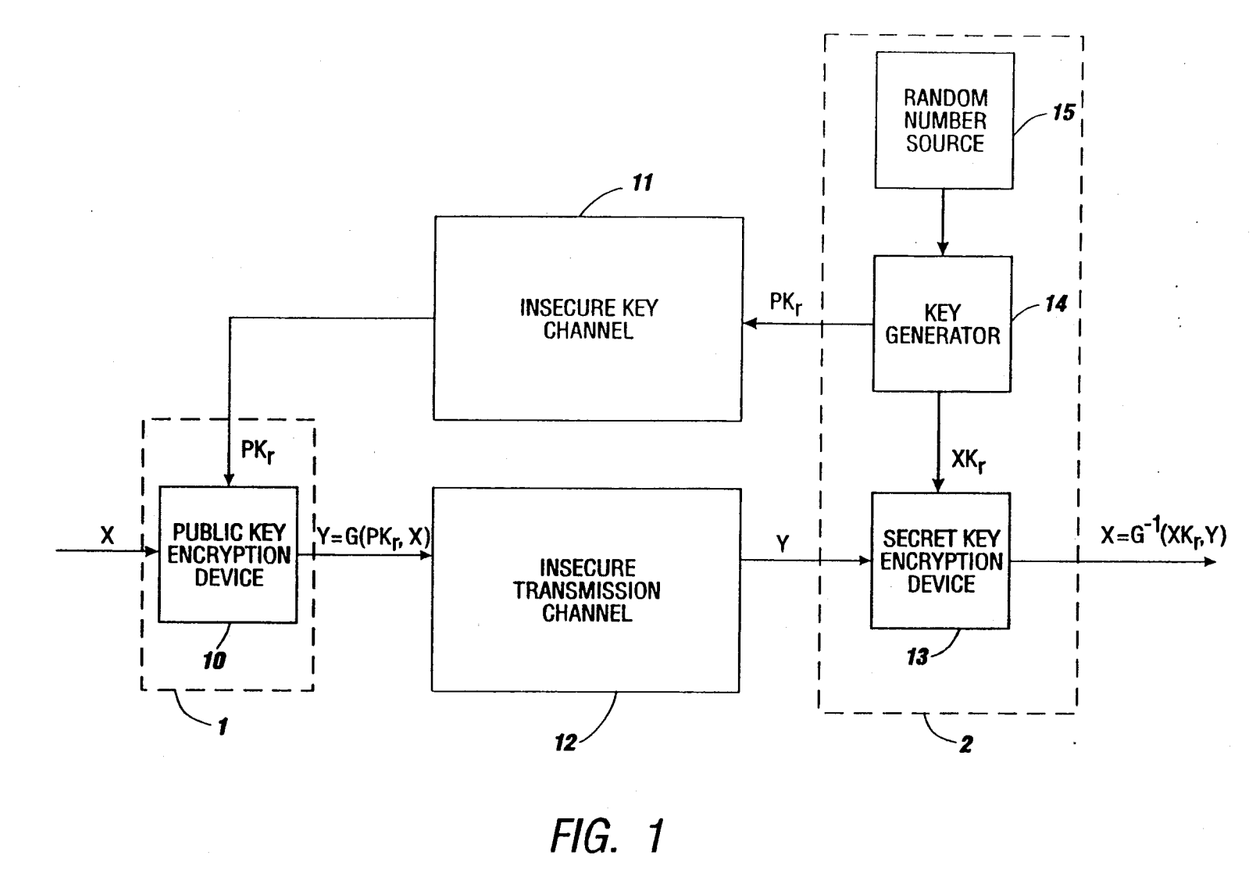
FIG. 1 is a block diagram of a communications system incorporating the present invention in its most basic form to achieve secure communications.

As shown in FIG. 1, the basic incorporation of the present invention to achieve secure communications includes a sender 1 with a Public Key Encryption Device 10, an Insecure Transmission Channel 12 such as a telephone line or radio link, and a receiver 2 with a Secret (Private) Key Encryption Device 13. The receiver 2 also possesses a Random Number Source 15 that is used by a Key Generator 14 to build two encryption/decryption key sets: a public key, $PK_r$, and a private key, $XK_r$. The public key, $PK_r$, is transmitted to the sender 1 by an Insecure Key Channel 11 that may be the same as the Insecure Transmission Channel 12 or may be through an off-line, pre-communications session method such as a directory of public key users on widely distributed magnetic media. A plain text message, X, destined for the receiver is encrypted by the Public Key Encryption Device 10 according to $Y = G(PK_r, X)$ where Y, a ciphertext, is computed by the Public Key transformation, G, according to the plain text, X, and the public key, $PK_r$. The computation of G is easy, but the computation of X knowing only Y, G, and $PK_r$ is infeasible. The ciphertext, Y, is communicated over the Insecure Transmission Channel 12 to the secret Key Encryption Device 13 of the receiver 2. Using the private key $XK_r$ that generated the public key $PK_r$, the receiver 2 recovers the plain text as $X = G^{-1}(XK_r, Y)$ thereby achieving secure communications. The inverse of the encryption function, $G^{-1}$, is easy to compute using the private key, $XK_r$.

Figure 2:
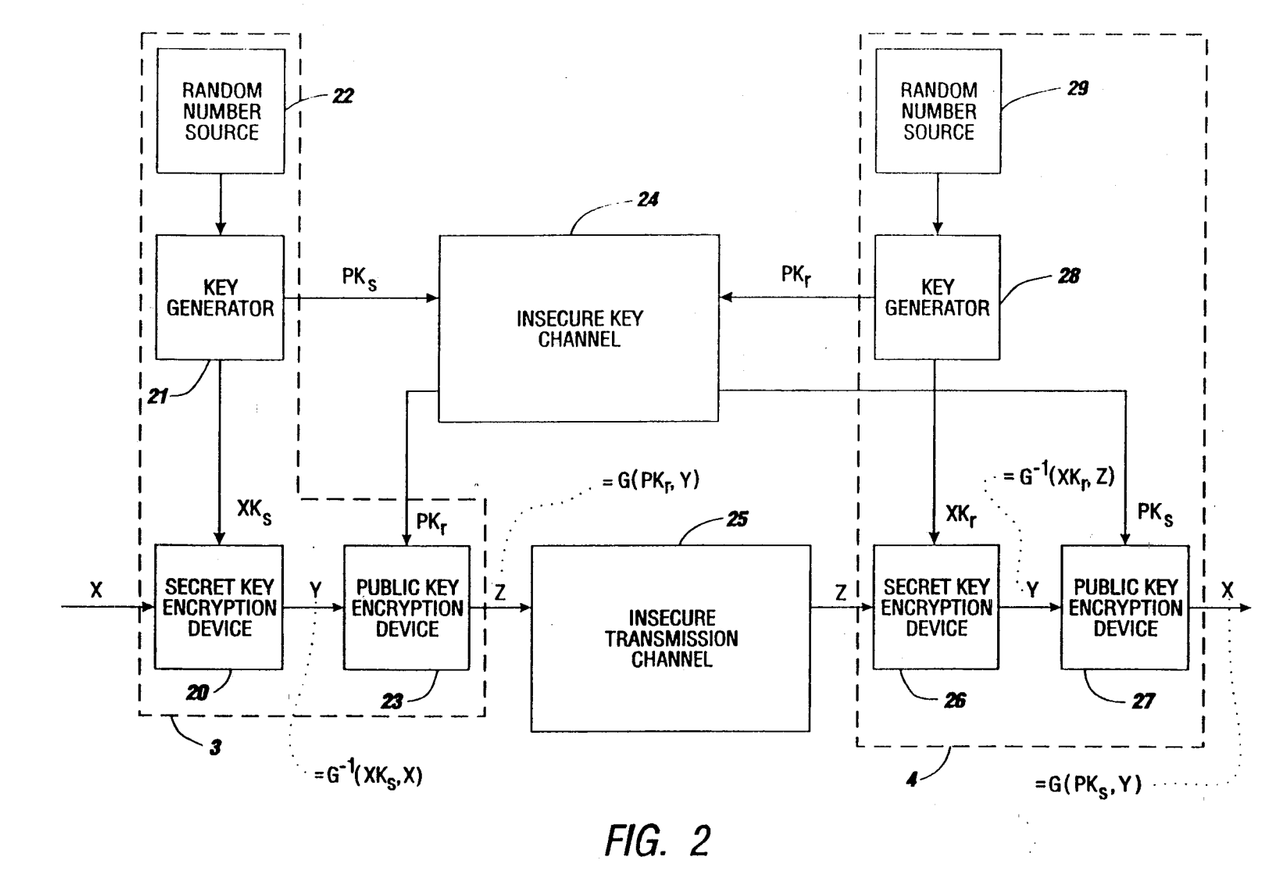
FIG. 2 is a block diagram of a communications system that incorporates the present invention in a manner that achieves communications that is both secure and authenticated so that the receiver is assured that the decrypted message came from the sender that purports to have sent it.

Referring to FIG. 2, the present invention may be incorporated in a communications system that allows for both plain text security and authentication of a sender 3. In this application, both the sender 3 and a receiver 4 possess a Secret Key Encryption Device and a Public Key Encryption device. The sender 3 uses a Random Number Source 22 and a Key Generator 21 to create a public key, $PK_s$, and a private key, $XK_s$. The public key, $PK_s$, of the sender 3 is transmitted to the receiver 4 by an Insecure Key Channel 24. In a similar manner, the receiver 4 uses a Random Number Source 29 and a Key Generator 28 to create a public key, $PK_r$, and a private key, $XK_r$. The public key, $PK_r$, of the receiver 4 is transmitted to the sender 3 by the Insecure Key Channel 24 which may or may not be identical to the channel used by the sender 3. A plain text, X, is first applied to the Secret Key Encryption Device 20 of the sender 3 using the private key, $XK_s$, to achieve a first encryption $Y = G^{-1}(XK_s, X)$. The sender 3 then uses the public key of the receiver 4, $PK_r$, to encrypt a second time using a Public Key Encryption Device 23 which achieves $Z = G(PK_r, Y)$. The cipher-text, Z, is transmitted to the receiver 4 via an Insecure Transmission Channel 25. The receiver 4 then reverses the process by which the cipher-text was created. Using the private key, $XK_r$, the receiver 4 recovers the intermediate encryption, Y, with a Secret Key Encryption Device 26 as $Y = G^{-1}(XK_r, Z)$. Next, using the sender's public key, $PK_s$, and a Public Key Encryption Device 27 the receiver 4 recovers the plain text as $X = G(PK_s, Y)$. Communications with this system is secure because only the receiver 4 possessing the private key $XK_r$ can recover the intermediate encryption Y and it is authenticated because only the sender 3 possessing the private key $XK_s$ could have created the intermediate encryption Y that can be decrypted with the public key $PK_s$.

The security of the invention's public key encryption is based on the infeasibility of solving a large enough set of simultaneous non-linear equations with coefficients chosen from a field $Z_p$ where P is a prime. Indeed, when P=2 which is the preferred embodiment, the problem of inverting such an equation set is known to be NP-Complete (see Garey, et al page 251). In the implementation of the invention, random processes are used to generate a set of parameters, the private key, which is used to construct a set of simultaneous non-linear equations that although infeasible to invert can be incrementally unraveled a piece at a time with knowledge of the private key.

In the preferred embodiment where $P=2$, data to be encrypted is easily blocked into binary strings of length N where N is the block size. While the method of encryption demonstrated here considers only a single block (an encryption method known as an Electronic Code Book), an actual application would use some form of inter-block dependency such as Cipher Block Chaining (see, for example, Meyer et al, page 62). Security of the system requires that a potential adversary not be able to invert the public key equation set either in the general case or for a particular block of ciphertext. It is believed that a block size of between 64 and 128 bits is more than adequate to achieve a high degree of security. It is one of the advantages of the current invention that the block size can be set arbitrarily large. While this increases the size of the public key, it does not decrease the throughput of the system; in the current invention, performance as measured by encrypted or decrypted bits per second is independent of the block size.

Figure 6:
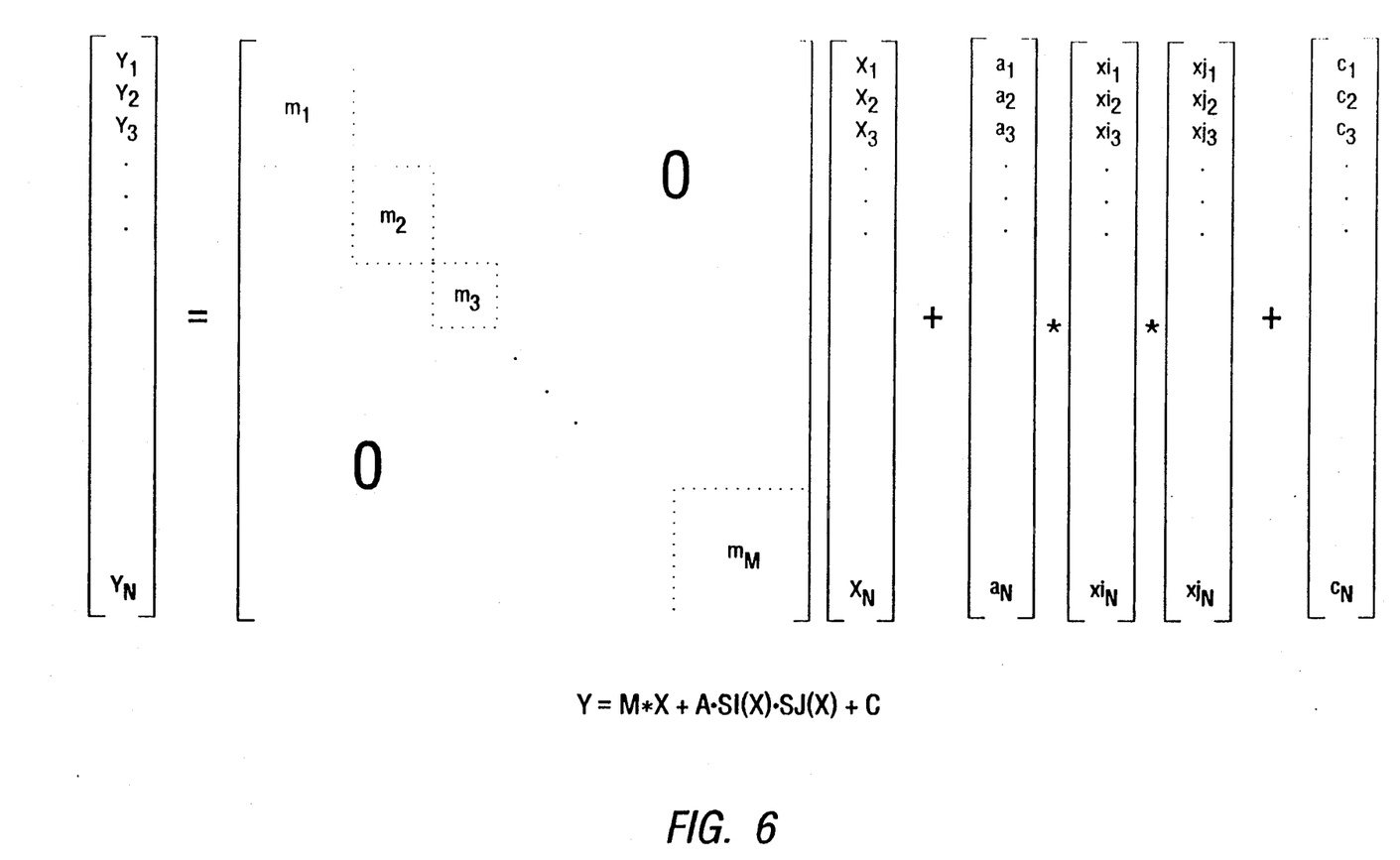
FIG. 6 is a diagram of the special form of the private key equation set format.

To understand how the present invention creates the public key and how a "trap door" is left through which the holder of the private key can recover the plain text, it is easiest to begin with the general form of an encryption transformation as shown in FIG. 6. As shown, the encrypting of a plain text message, X, (shown as $X_1, X_2, \ldots, X_N$) is by a linear matrix, M, a multiplicative vector $(a_1, a_2, \ldots, a_N)$ that multiplies the product of two selected sets of the plain text, $(xi_1, xi_2, \ldots, xi_N)$ and $(xj_1, xj_2, \ldots, xj_N)$ and an additive vector $(c_1, c_2, \ldots, c_N)$. Two transformations such as shown in FIG. 6 but with different parameter sets are performed and each is followed by a permutation. The two transformations and two permutations constitute an encryption cycle by the public key; the encryption cycle may be applied multiple times for increased security. The parametarizations of the transformations and permutations are driven by random processes so that two executions of the key generation process will yield different key sets. The public key is the non-linear polynomial equation set that results when transformations and permutations are collapsed and expressed symbolically in terms of the plain text, X. This symbolic representation effectively obscures the internal details of the transformations and permutations, hiding the private key and requiring a cryptanalyst to deal with the non-linear equation set, the inversion of which is an NP-Complete computational problem as noted above. The decryption of the cipher-text resulting from the application of the public key equation set is facilitated by the knowledge of the internal structure of the transformations and permutations, particularly their parameters which are the private key.

Referring to FIG. 6, notice that the linear matrix, M, has a special diagonal form consisting of a random number of random sub-matrices (designated $m_1, m_2$, etc. in the figure) along the principal diagonal with all other elements zero. The additional feature of the transformation which makes it invertible by the receiver is that the selected sets of plain text $(xi_1, xi_2, \ldots$ and $xj_1, xj_2, \ldots$ in the figure) are carefully, although randomly, chosen only from the plain text variables that lie totally above the submatrix $m_i$ to which it corresponds (and is in the same row). With these restrictions on the form of the transformation it can be inverted as follows: given the ciphertext, Y, the transformation can be inverted and solved for the plain text X a submatrix at a time ($m_1$, then $m_2$, then $m_3$, etc.) and, when solved in this manner from top to bottom, the non-linear plain text terms (of the form $a_k * xi_k * xj_k$) have already been found by the time they are needed and is simply added to the constant vector, c ($c_1, c_2$, etc. in FIG. 6), during the solution of any submatrix.

Figure 3:
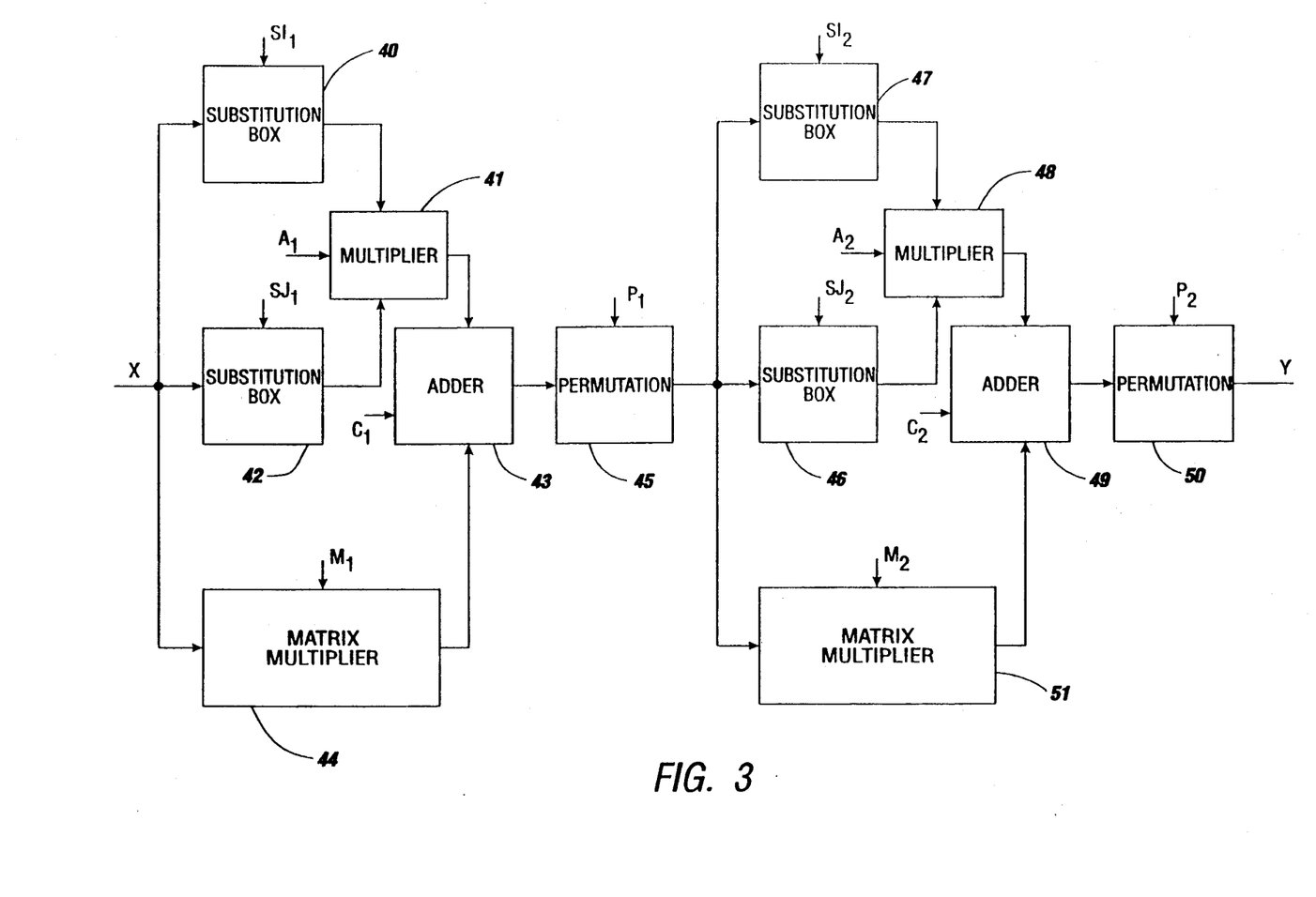
FIG. 3 is a block diagram of the public key encryption device as a functional implementation of the private key set.

The entire encryption process using the public key can be understood first in the functional block diagram shown in FIG. 3 (this figure is a functional block diagram of the implementation of the Public Key Encryption Devices 10, 23, and 27 in FIG. 1 and FIG. 2). It is important to note that while this diagram functionally represents the public key encryption process, the internal structure and parameters of the public key encryption device so represented are inaccessible to the user of the public key, that is, the public key user has access only to the plain text, X, and the cipher text, Y.

The private key set which implements the public key in FIG. 3 consists of two linear matrices ($M_1$ and $M_2$), two multiplicative vectors ($A_1$ and $A_2$), two additive vectors ($C_1$ and $C_2$), four substitution functions ($SI_1$, $SJ_1$, $SI_2$ and $SJ_2$), and two permutations ($P_1$ and $P_2$). An input plain text X in a first transformation stage is shown on the left of FIG. 3. An output of a Permutation 45 is the permutation specified by the permutation vector $P_1$ of the output of an Adder 43 which is a sum of three quantities: (1) the constant vector $C_1$, (2) a matrix multiplication of the input plain text, X, with $M_1$ in a Matrix Multiplier 44 and (3) a product given by a Multiplier 41 of the constant vector, $A_1$, a subset of the input X selected by a Substitution Box 40 by the substitution function $SI_1$, and a subset of the input X selected by a Substitution Box 42 by the substitution function $SJ_1$. The right half of FIG. 3, elements 46, 47, 48, 49, and 51 repeats the transformation of the left half of FIG. 3 (40, 41, 42, 43, and 44) respectively, with the output of the Permutation 45 with a different parameter set ($A_2, C_2, M_2, SI_2, SJ_2$, and $P_2$) to produce a ciphertext, Y. As noted above, the encryption of FIG. 3 may be repeated multiple times and/or as shown in FIG. 2 may follow an encryption cycle with the sender's private key to provide communication that is both secure and authenticated.

Figure 4:
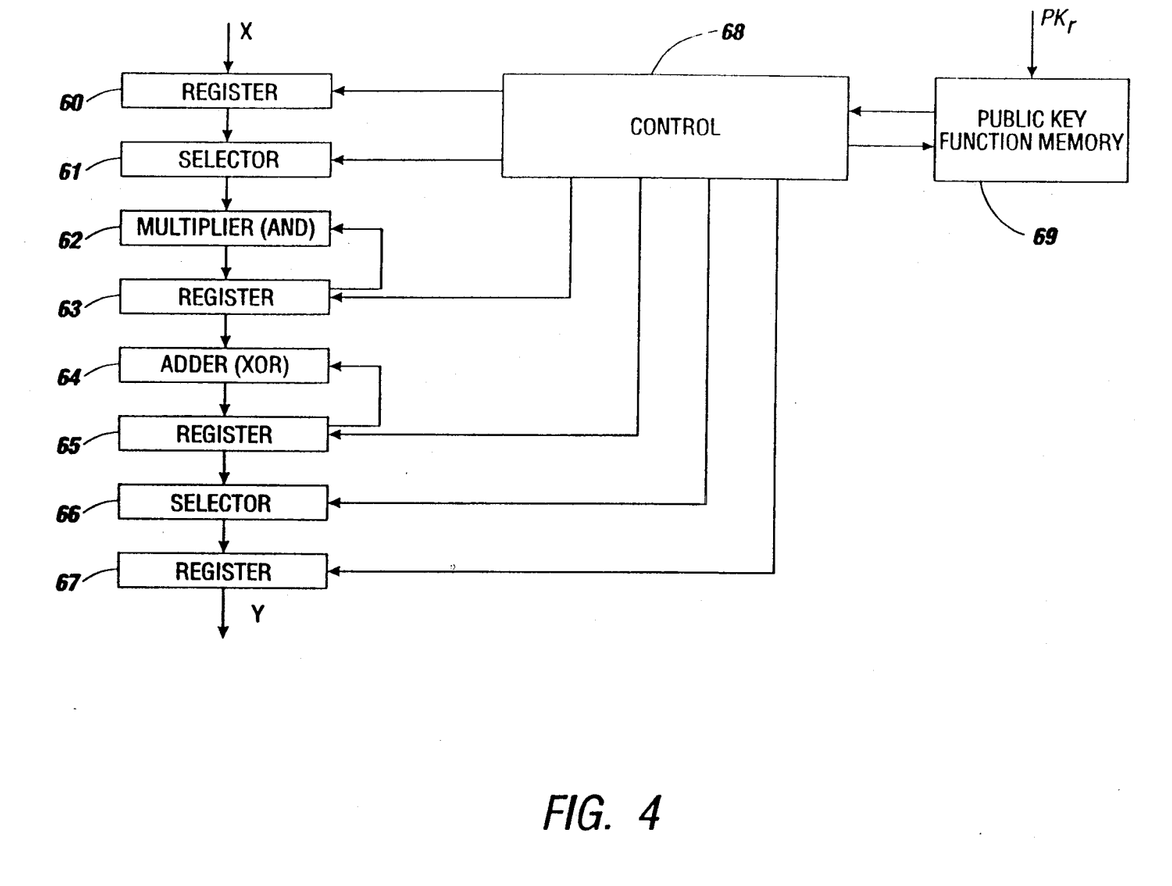
FIG. 4 is a block diagram of the public key encryption device as a direct implementation of the private key set reduced to public key form.

The actual implementation of a public key encryption device is applied to the public key equation set since the parameter sets of the private key shown in FIG. 3 are unavailable to the sender. FIG. 4 shows a block diagram of how the public key encryption device might actually be implemented (this is the actual implementation of the Public Key Encryption Devices 10, 23, and 27 in FIG. 1 and FIG. 2). It is in this block diagram that we first make explicit use of the choice of the prime $P=2$ for the modulus of the equation set. Until this point in the description, the invention could be implemented with P chosen to be any other prime number with the plain text a vector of numbers chosen from $0, 1, 2, \ldots, (P-1)$.

Having chosen $P=2$ the operation of multiplication modulo P reduces to logical AND and the operation of addition modulo P reduces to logical XOR as shown in FIG. 4. As shown in this figure, the public key of the intended receiver, $PK_r$, is stored in a Public Key Function Memory 69 which is accessed under the direction of a Control 68 to effect the encryption. A Register 60 has a length N equal to the code block size and is loaded with that number of bits of a plain text, X. (If there is less than that number of bits left to be transmitted, the register may be padded with zeroes).

At the start of the encryption of a block, the Control 68 initializes itself to access the first public key equation in the Public Key Function Memory 69. The processing of each equation is similar. An accumulator Register 65 which has a single bit (and would typically be implemented as a D-type flip-flop) is cleared to "0". For each term in the equation, a multiplier Register 63 (also a D-type flip-flop) is initialized to "1". For each factor in a term, the Control 68 uses a Selector 61 (a multiplexer delivering one of N inputs to its output) to choose the proper bit from the Register 60 to be applied to a Multiplier (AND) 62 (a simple AND gate) which has as its second input the Register 63 which represents the product of the factors in the term computed so far. At the end of a term, the output of the Register 63 is applied to an Adder (XOR) 64 (a simple XOR gate) which has as its other input the contents of the Register 65, the accumulation of the terms of the encrypted bit. After processing the last term of a public key equation, the Control 68 uses a Selector 66 to direct the ciphertext bit into an output Register 67 which has a length equal to the block size, N.

After all equations have been processed, the Register 67 contains the ciphertext, Y, which can be clocked out serially as required. It could be noted that if the equations are processed in order, it is not necessary to wait for all the ciphertext bits to be available before they are transmitted. However, all of the plain text must be available in the Register 60 before any ciphertext can be computed.

Figure 5:
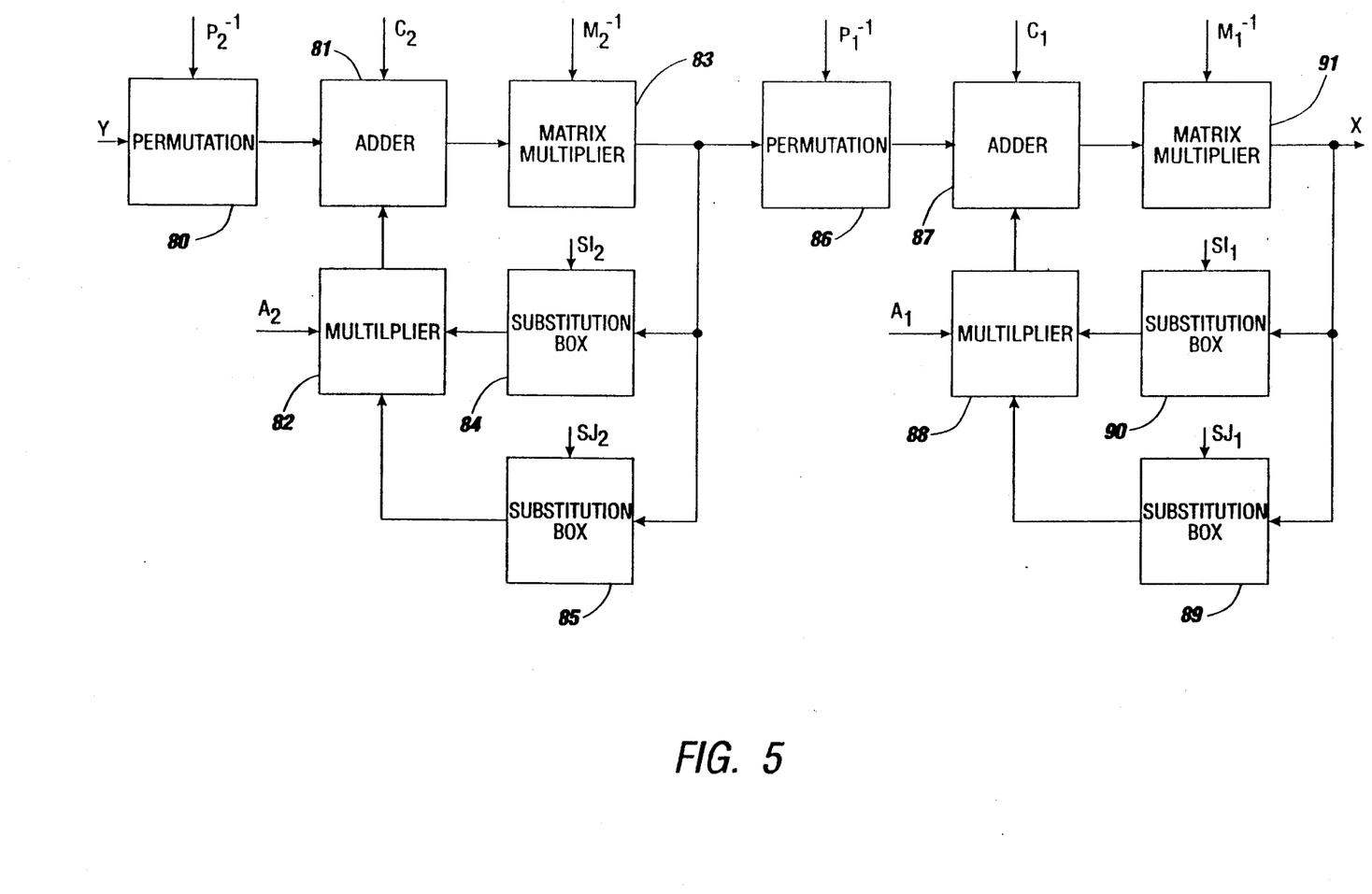
FIG. 5 is a block diagram of the private key encryption/decryption device.

FIG. 5 is a block diagram that details the operation of decryption with the private key. (This is an implementation of the Secret Key Encryption Devices 13, 20, and 26 in FIG. 1 and FIG. 2). In this diagram, the parameters $A_1$, $A_2$, $C_1$, $C_2$, $SI_1$, $SJ_1$, $SI_2$, and $SJ_2$ are identical to the parameters in FIG. 3 while $P_1^{-1}$ and $P_2^{-1}$ are the inverses of the permutations $P_1$ and $P_2$ and $M_1^{-1}$ and $M_2^{-1}$ are the inverses of the linear matrices $M_1$ and $M_2$. The private key encryption device in FIG. 5 accepts the ciphertext, Y, and first undoes the effect of the second permutation (the Permutation 50 in FIG. 3) with a Permutation 80 using $P_2^{-1}$. An Adder 81, a Multiplier 82, a Matrix Multiplier 83, a Substitution Box 84, and a Substitution Box 85 effect the undoing of the second transformation on the right hand side of FIG. 3 (transformed by 46, 47, 48, 49, and 51) using the mathematical inversion discussed in connection with FIG. 6. (It is important to note that the apparatus in FIG. 5 uses adders because addition and substraction are equivalent modulo 2; if the invention is implemented for a choice of prime other than 2, subtraction modulo the prime must be used.) The input to a Permutation 86 is identical to the output of the Permutation 45 in FIG. 3. The Permutation 86 undoes the permutation $P_1$ (by the Permutation 45 in FIG. 3) using $P_1^{-1}$. The rest of the apparatus in FIG. 5 (an Adder 87, a Multiplier 88, a Matrix Multiplier 91, a Substitution Box 90 and a Substitution Box 89) undoes the first transformation state on the left of FIG. 3 (transformed by 40, 41, 42, 43, and 44) to produce the plain text, X.

Figure 7:
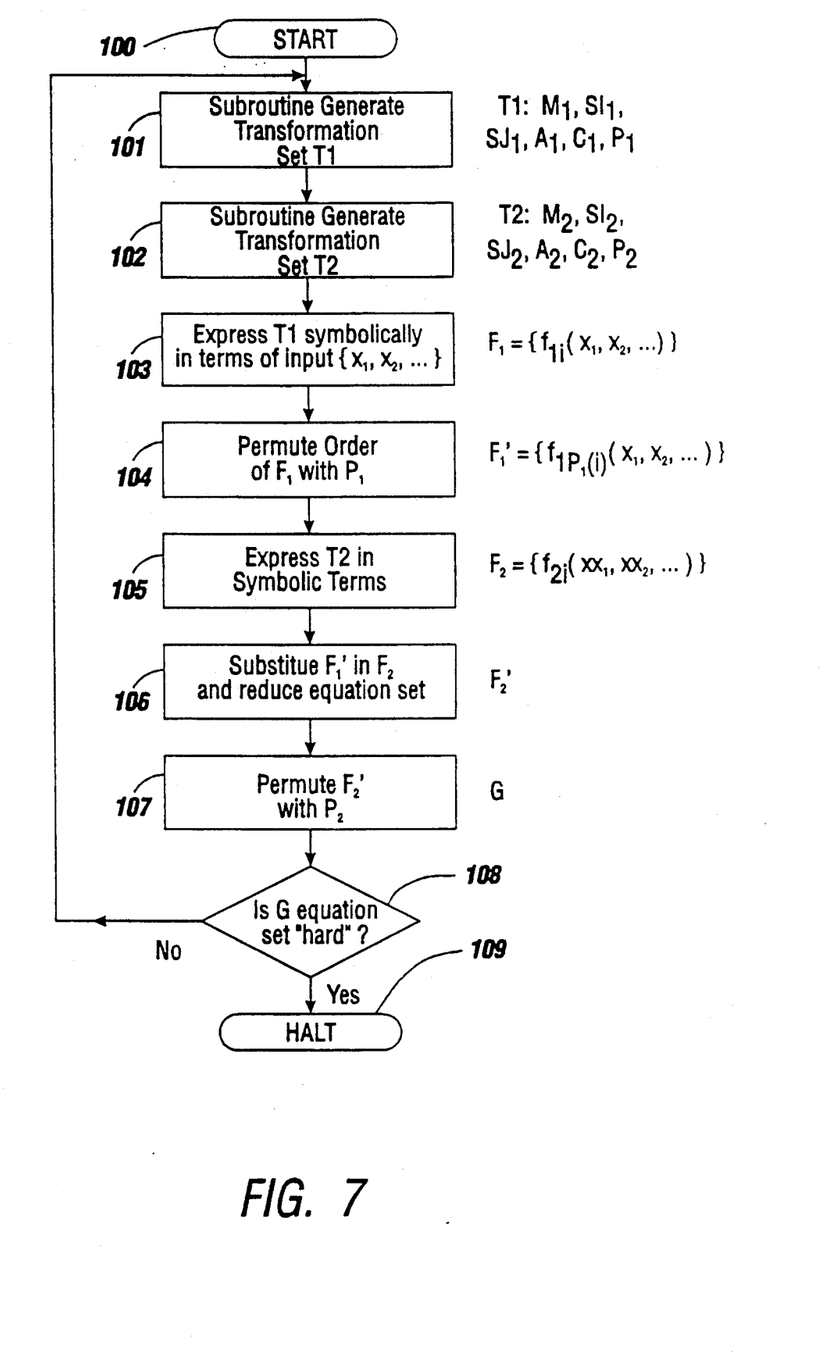
FIG. 7 is a flow chart of the private/public key generation process.
Figure 8:
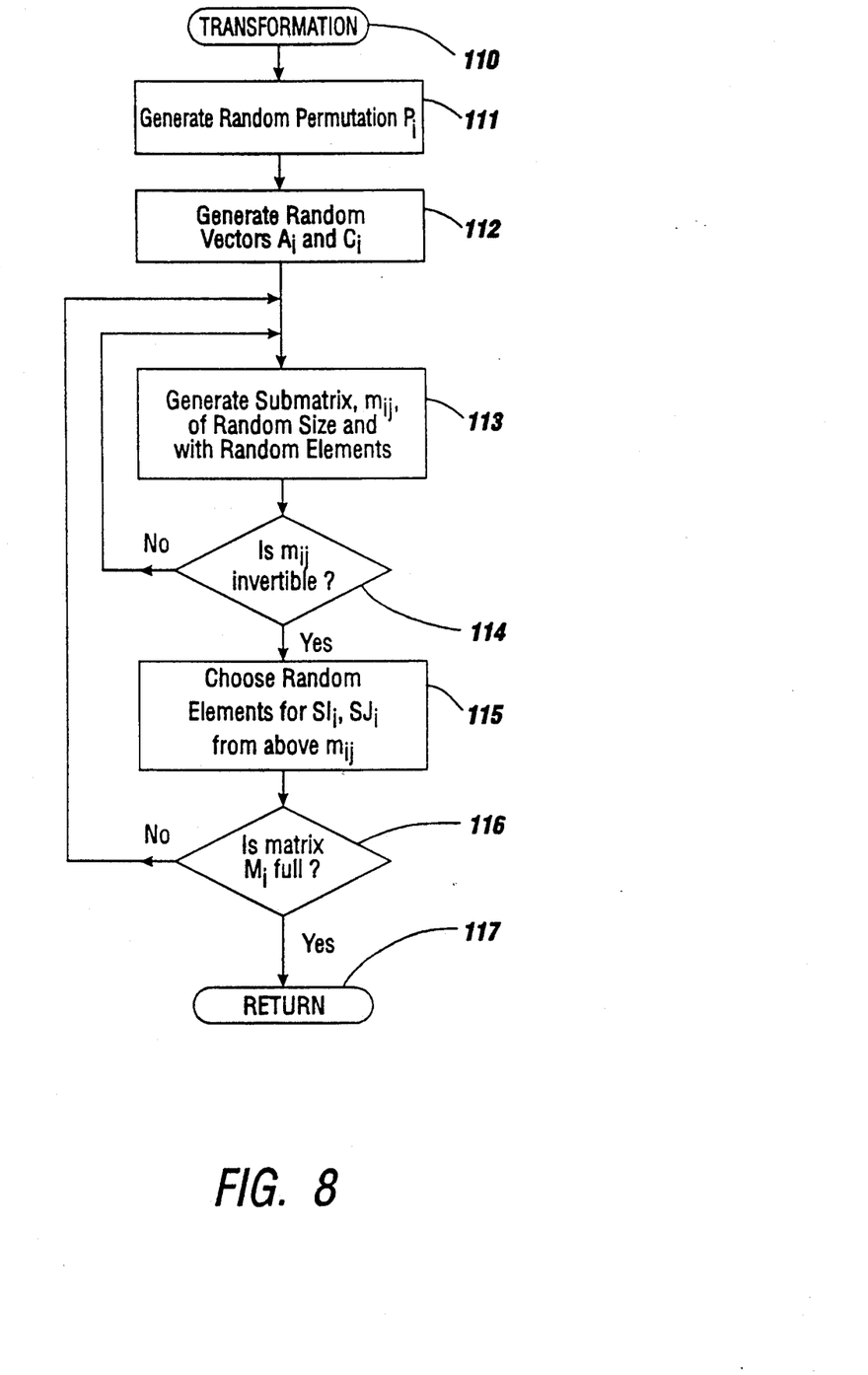
FIG. 8 is a flow chart of the subroutine generating random private key transformation parameters.

FIG. 7 is a flow chart of the overall key generation process for generating public and private keys while FIG. 8 shows the details of a subroutine generating a set of transformation parameters. As shown in FIG. 7, the first two steps 101 and 102 in generating a set of encryption keys create two sets of transformation parameters. As seen in FIG. 8, a generation of a set of transformation parameters results in (1) a random permutation, $P_i$ in step 111, (2) a random multiplicative vector, $A_i$ in step 112, (3) a random additive vector, $C_i$ in step 112, (4) a random linear matrix, $M_i$ in steps 113 and 114, and (5) two random selection functions, $SI_i$ and $SJ_i$ in step 115. The random permutation vector, $P_i$, is generated in step 111 under the control of the Random Number Source (15, 22, or 29 in FIG. 1 and FIG. 2) and is a vector of length equal to N, the encrytion block size, containing each variable symbol ($X_1$, $X_2$, ...) once and in a random order. The random multiplicative and additive vectors, $A_i$ and $C_i$, generated at step 112 contain N values either "0" or "1" chosen at random under the control of the Random Number Source. In FIG. 8 at steps 113 and 114, the linear matrix, $M_i$, is generated as a sequence of submatrices, $m_{ij}$, along the principal diagonal as shown in FIG. 6. First, the size of the matrix is chosen randomly between one and a maximum size that is arbitrary, but significantly smaller than the block size, N, and never so large that $M_i$ would exceed its maximum dimension. Second, this submatrix is populated with zeros and ones randomly where the probability of a one in a row or column is another arbitrary value. Finally in step 114, the submatrix is tested to see if it possesses an inverse and if it does not it is discarded and another random submatrix is generated at step 113. For each submatrix, random elements are chosen for substitution functions, $SI_i$ and $SJ_i$ from the vector input to the transformation at step 115. These elements are restricted to the range of variables that lie entirely above the top row of the submatrix just generated meaning that no variables will be substituted for the first submatrix, $m_1$. Finally, at step 116, if the submatrix just generated has filled the larger matrix of which it is part, execution terminates and the transformation parameter set is returned to the key generation process in FIG. 7 at step 101 or 102.

Returning to FIG. 7, a next step 103 in the key generation process is to express a transformation, $T_1$, represented by $M_1$, $A_1$, $C_1$, $SI_1$, and $SJ_1$ in equation form as $F_1$, a function of the plain text variables in symbolic form. Referring to FIG. 3, the equation set represents the output of the Adder 43. The equation set designated in FIG. 7 as $F_1$ is at step 104 permuted by the permutation vector $P_1$ to produce the equation set $F_1'$ which corresponds to the output of the Permutation 45 in FIG. 3. The equation set is reduced using Boolean operations in which advantage is taken of relations such as $X_i*X_i=X_i$ and $X_i+X_i=0$ and is put in lexicographical order. A next step 105 in generating the public key set is to perform the symbolic representation of the transformation on the right hand side of FIG. 3 (the transformation by 46, 47, 48, 49, and 51). This results in a symbolic equation set designated as $F_2$ in FIG. 7 (which is the input to the Permutation 50 in FIG. 3). Substituting $F_1'$ found above into $F_2$ at step 106 results in $F_2'$ expressed in terms of the input plain text, X, which is reduced using Boolean operations and ordered lexicographically as above. Finally, $P_2$ (the Permutation 50 in FIG. 3) is used to permute the order of equations at step 107 and produce the public key encrytion set G.

In a final step 108, a series of tests of the resulting public key set are made to assure that the equation set is indeed "hard" to invert and that the random processes have not inadvertently produced a set of equations that are easier to invert than the block size would suggest; for example, the public key should not be separable into two sets of equations each of which can be solved apart from the other. At the conclusion of the key generation process at step 109, the equation set represented in G is the public key and the parameter sets which constructed it ($M_1$, $M_2$, $A_1$, $A_2$, $C_1$, $C_2$, $P_1$, $P_2$, $SI_1$, $SI_2$, $SJ_1$, and $SJ_2$) is the private key to be saved for private key encryption/decryption.

A numerical example will make the operation of the invention clear. The first part of the example demonstrates the key generation process. Although in a practical application the block size would be chosen much larger, a block size of 8 is chosen for the example to keep the process simple to follow. During the course of the example, (1) a public and private key will be generated, (2) the public key will be used to encrypt an 8 bit plain text, the ASCII character "A", to a ciphertext, and (3) the private key will be used to recover the plain text "A". To more easily follow the example, refer to the flow chart in FIG. 7, the functional block diagram of the public key encryption device in FIG. 3, and the block diagram of the private key encryption device in FIG. 5.

As the first step in the key generation process two sets of private key transformation sets are generated under the control of a random number source. These are the linear matrices ($M_1$ and $M_2$), the substitution functions ($SI_1$, $SI_2$, $SJ_1$, and $SJ_2$), the additive vectors ($C_1$ and $C_2$), the multiplicative vectors ($A_1$ and $A_2$), and the permutation vectors ($P_1$ and $P_2$).

The private key transformation sets for the example are generated randomly according to the flow chart in FIG. 7 at steps 101 and 102 and are as follows:

$$M_1 = \begin{vmatrix} 1 \\ 11 \\ 10 \\ 010 \\ 101 \\ 100 \\ 10 \\ 01 \end{vmatrix} \quad M_2 = \begin{vmatrix} 1 \\ 010 \\ 100 \\ 011 \\ 011 \\ 001 \\ 100 \\ 1 \end{vmatrix}$$

$SI_1 = [0, 1, 1, 2, 2, 2, 6, 6] \quad SI_2 = [0, 1, 1, 1, 2, 4, 2, 7]$
$SJ_1 = [0, 1, 1, 3, 2, 2, 1, 2] \quad SJ_2 = [0, 1, 1, 1, 2, 1, 3, 6]$ where a "0" indicates no element is to be substituted at this position and "n" indicates that the $n^{th}$ variable is to be substituted at this position.

$A_1 = (0, 1, 1, 1, 1, 1, 1, 1) \quad A_2 = (0, 1, 1, 1, 1, 1, 1, 1)$
$C_1 = (0, 1, 0, 0, 1, 0, 0, 1) \quad C_2 = (0, 0, 1, 0, 1, 0, 1, 0)$
$P_1 = \{4, 8, 1, 3, 5, 7, 6, 2\} \quad P_2 = \{7, 4, 3, 2, 1, 6, 8, 5\}$ where "n" in a permutation position indicates that the $n^{th}$ variable is to be substituted for this location in the permutation's output.

For purposes of encryption/decryption with the private key, the inverses of the linear matrices and permutations are computed as:

$$M_1^{-1} = \begin{vmatrix} 1 \\ 01 \\ 11 \\ 001 \\ 100 \\ 011 \\ 10 \\ 01 \end{vmatrix} \quad M_2^{-1} = \begin{vmatrix} 1 \\ 010 \\ 100 \\ 101 \\ 001 \\ 110 \\ 010 \\ 1 \end{vmatrix}$$

$P_1^{-1} = \{3, 8, 4, 1, 5, 7, 6, 2\} \quad P_2^{-1} = \{5, 4, 3, 2, 8, 6, 1, 7\}$ Referring to FIG. 7, the next step 103 in the key generation process is to express the first stage of transformation symbolically in terms of the input vector, X. The resulting equation set, $F_1$, is the output of the Adder 43 in FIG. 3. Each equation is the result of the substitutions in the two Substitution boxes 40, 42 according to $SI_1$ and $SJ_1$ being multiplied by the Multiplier 41 with the additional factor $A_1$ to which is added in the Adder 43 the matrix product of the input X with the linear matrix $M_1$ in the Matrix Multiplier 44 and the constant vector $C_1$. The equation set, $F_1$, when reduced algebraically modulo 2 is shown below:

$f_{1,1} = X_1$ $f_{1,2} = X_1 + X_2 + X_3 - 1$ $f_{1,3} = X_1 + X_2$ $f_{1,4} = X_2 \cdot X_3 + X_5$ $f_{1,5} = X_2 + X_4 + X_6 + 1$ $f_{1,6} = X_2 + X_4$ $f_{1,7} = X_1 \cdot X_6 + X_7$ $f_{1,8} = X_2 \cdot X_6 + X_8 + 1$ The next step 104 in the key generation process is to permute $F_1$ with the permutation $P_1$ to yield $F_1'$ at the output of the Permutation 45:

$f_{1,1}' = X_2 \cdot X_3 + X_5$ $f_{1,2}' = X_2 \cdot X_6 + X_8 + 1$ $f_{1,3}' = X_1$ $f_{1,4}' = X_1 + X_2$ $f_{1,5}' = X_2 + X_4 + X_6 + 1$ $f_{1,6}' = X_1 \cdot X_6 + X_7$ $f_{1,7}' = X_2 + X_4$ $f_{1,8}' = X_1 + X_2 + X_3 + 1$ In a similar fashion, following the next step 106 of key generation process yields the second transformation set in an equation form as $F_2$. This appears in FIG. 3 as the output of the Adder 49:

$f_{2,1} = XX_1$ $f_{2,1} = XX_1 + XX_3$ $$f_{2,3} = XX_1 \cdot XX_2 - 1$$

$$f_{2,4} = XX_1 \cdot XX_3 \cdot XX_4$$

$$f_{2,5} = XX_2 + XX_6 \cdot XX_7 - 1$$

$$f_{2,6} = XX_1 \cdot XX_4 \cdot XX_7$$

$$f_{2,7} = XX_2 \cdot XX_3 \cdot XX_5 - 1$$

$$f_{2,8} = XX_6 \cdot XX_7 + XX_8$$

The final steps 106, 107 in the process are to substitute the equation set $F_1'$ into $F_2$ (replacing $XX_1$ with $f_{1,1}'$, $XX_2$ with $f_{1,2}'$, etc.) to produce $F_2'$ and finally, permute with $P_2$ to produce the public key equation set G. The public key set for the example is given by:

$$g_1 = X_1 + X_1 \cdot X_2 \cdot X_6 - X_1 \cdot X_8 + X_2 + X_4 + X_6$$

$$g_2 = X_2 + X_2 \cdot X_3 + X_5$$

$$g_3 = X_2 \cdot X_3 - X_2 \cdot X_6 - X_5 + X_8$$

$$g_4 = X_1 - X_2 \cdot X_3 - X_5$$

$$g_5 = X_2 \cdot X_3 - X_5$$

$$g_6 = X_1 \cdot X_2 \cdot X_3 - X_1 \cdot X_5 - X_2 - X_2 \cdot X_3 - X_2 \cdot X_5 + X_4$$

$$g_7 = X_1 - X_1 \cdot X_2 \cdot X_6 - X_1 \cdot X_4 \cdot X_6 - X_2 - X_2 \cdot X_7 - X_3 - X_4 \cdot X_7 - 1$$

$$g_8 = X_1 \cdot X_6 - X_2 - X_2 \cdot X_6 - X_4 + X_7 - X_8$$

To continue the example, the public key generated above is used to encrypt a plain text. The public key, G, is made available to potential communicators with the receiver who holds the private key set that generated it. As an example using the public key generated above, take as the plain text the ASCII character "A" which is 65 decimal, $41_{16}$ and $01000001_2$. The input vector, X, to the public key encryption device in FIG. 4 (10, 23, or 27 in FIG. 1 and FIG. 2) is $X_1=0$, $X_2=1$, $X_3=0$, $X_4=0$, $X_5=0$, $X_6=0$, $X_7=0$, and $X_8=1$. Using the notation, $Y_i=g_i$, and substituting X into the public key equation G ($g_1$, $g_2$, ...) yields $Y_1=1$, $Y_2=1$, $Y_3=1$, $Y_4=0$, $Y_5=0$, $Y_6=1$, $Y_7=0$, and $Y_8=0$ which is an output vector $Y=11100100_2=E4_{16}=228$ decimal. The encrypted vector, Y, is transmitted over the insecure channel to the receiver who holds the private key that generated the public key used to encrypt the plain text, "A".

Using the encrypted text from the previous paragraph and referring to the block diagram of the private key encryption/decryption device in FIG. 5 (13, 20, or 26 in FIG. 1 and FIG. 2), the input ciphertext vector, Y, to the Permutation 80 is $11100100_2 = E4_{16}$. Applying the inverse permutation function $P_2^{-1}$ (Permutation 80) yields the input to the Adder 81 of $00110110_2=36_{16}$. The sum of this input, the constant $C_2$, and the product of the outputs of the Substitution Boxes 84, 85 is applied to the Matrix Multiplier 83 using the inverse matrix $M_2^{-1}$. Note that because the computation is done from the top of $M_2^{-1}$ and because of the form of the matrix $M_2^{-1}$ and the careful selection of the substitution functions $SI_2$ and $SJ_2$, the values of the output of the Matrix Multiplier 83 that are needed as input to the Adder 81 (through the Multiplier 82 from the Substitution Boxes 84, 85) and, hence, the Matrix Multiplier 83 are already computed before they are needed. After this transformation stage, the input to the Permutation 86 is $00010010_2=12_{16}$ and the output of this permutation using $P_1^{-1}$ is $00100100_2=24_{16}$. This is input to the second transformation stage consisting of the Adder 87, the Multiplier 88, the Matrix Multiplier 91, the Substitution Box 90, and the Substitution Box 89. This transformation operates in the manner described above for the first transformation to yield a final output vector $X=01000001_2=41_{16}$ which is the plain text ASCII "A" that was encrypted with the public key by the sender.

Among the special capabilities and improvements embodied in the present invention of a public key encryption system are its improved performance, its ease of implementation in hardware or software, its high degree of flexibility, and the number of potential variations each of which is part of a family of public key encryption devices that trade off security, key size, and performance to suit a given application. All of the operations required to encrypt or decrypt plain text are the simple logic operations of XOR and AND. This means that it can be implemented easily and economically in hardware or software where hardware is well suited to low cost VLSI and even software implementation can be obtained at very high performance. Prototype software implementation has demonstrated operation of encryption and decryption at tens of thousands of bits per second; more than sufficient to keep up with the operation of the highest speed dial-up modems. A hardware implementation will be capable of hundreds of thousands to millions of bits per second depending on the specific implementation architecture and technology. As discussed earlier, the flexibility of the current invention allows the choice of an arbitrary cipher block size with no sacrifice in performance; the only cost is an increase in public key size proportional to $N^*\log(N)$ and in private key size linearly proportional to N, where N is the encryption block size. Finally, there are numerous variations on the structure of the invention that lead to non-linear equation sets for a public key that may have their own special virtues for specific application.

While the invention has been shown and described with reference to the preferred embodiment thereof, it will be understood by those skilled in the art that the above and other changes in form and detail may be made therein without departing from the spirit and scope of the invention. For example, the preferred embodiment contains only two transformation stages and two permutations with non-linear terms generated by the product of two input variables. Variations include more transformation stages, non-linear terms generated by the products of more than two input variables, alternation of multiple applications of sender private keys and receiver public keys and even transformation stages that perform a fixed set of permutations and substitutions independent of the particular public/private keys being used. Other implementation details include multiple applications of the public/private key sets, interblock dependency usage as in Cipher Block Chaining mentioned above, and the potential of developing the system around a prime modulus other than two. All of the potential variations are rooted in the NP-hardness of solving the public key equation set containing non-linear algebraic terms and the hidden parametarization of the private key that allows the unraveling of the ciphertext.

What is claimed is:

1. A method of communicating securely over an insecure communications channel including the steps of:
   A. generating a private key at a receiver that consists of a multiplicity of transformation steps of a plain text variable vector of fixed, but arbitrary length, wherein all steps are under the control of a random number source and wherein all operations of addition, subtraction, and multiplication are performed modulo a prime number, P, and wherein each transformation step comprises:
      a. multiplying a linear matrix by an input vector to yeild an intermediate vector, wherein the linear matrix contains its non-zero elements only in a multiplicity of submatrices along its principal diagonal and each submatrix possesses an inverse;
      b. substituting the input vector in a multiplicity of substitution vectors in which a variable of the input vector may appear more than once or not at all and where each substitution vector location contains only variables of the input vector that lie in locations entirely above the submatrix of the linear matrix to which they correspond;
      c. multiplying the substitution vectors by each other and a first constant vector to yield a product vector;
      d. adding the intermediate vector to the product vector and to a second constant vector to yield a sum vector;
      e. permuting the sum vector with a permutation vector to yield an output vector in which each element of the sum vector appears once, but in a usually different position than in the sum vector;
      f. generating an inverse linear matrix as the inverse of the linear matrix;
      g. generating an inverse permutation as the inverse of the permutation vector;
   B. hiding the private key by generating a public key at the receiver that represents the private key as a set of non-linear polynomial equations modulo the prime P by symbolically solving the multiplicity of transformation steps in terms of the plain text variable vector and reducing the set of non-linear polynomial equations to simplest terms;
   C. transmitting the public key to a sender via an insecure key channel;
   D. encrypting a plain text vector at the sender according to the public key by substituting the plain text vector into the set of non-linear polynomial equations to produce a ciphertext;
   E. transmitting the ciphertext via an insecure communications channel to the receiver;
   F. decrypting the ciphertext at the receiver with the private key with a private key decryption process to produce the plain text thereby achieving secure communications; wherein the private key decryption process operates by reversing the multiplicity of transformation steps of the private key in a reverse order to which they were applied and wherein reversing a transformation step comprises:
      a. reversing the permutation of an input vector using the inverse permutation to create an inverse permutation vector;
      b. starting from the top of the inverse linear matrix and considering each submatrix in turn;
      c. subtracting from the inverse permutation vector the sum of the product of the first constant vector and the multiplicity of substitutions of an output vector and the second constant vector to create an intermediate subvector, wherein operations are restricted to the range of the current submatrix;
      d. multiplying the intermediate subvector by the submatrix of the inverse linear matrix to create a corresponding subvector of the output vector;
      e. repeating the steps F.c. and F.d. until all of the inverse linear matrix has been exhausted and the output vector contains the reversion of the transformation step.

2. A method of claim 1 in which the prime, P, is chosen as P=2 whereby all of the operations of multiplication, addition, and subtraction modulo the prime reduce to logical AND, XOR and XOR operations respectively.

3. An apparatus for communicating securely over an insecure communications channel comprising:
   A. a means of generating a private key at a receiver that consists of a multiplicity of transformation means of a plain text variable vector of fixed, but arbitrary length, wherein all means are under the control of a random number source means and wherein all means of addition, subtraction, and multiplication are performed modulo a prime number, P, and wherein each transformation means comprises:
      a. a means of multiplying a linear matrix by an input vector to yield an intermediate vector, wherein the linear matrix contains its non-zero elements only in a multiplicity of submatrices along its principal diagonal and each submatrix possesses an inverse;
      b. a means for substituting the input vector in a multiplicity of substitution vectors in which a variable of the input vector may appear more than once or not at all and where each substitution vector location contains only variables of the input vector that lie in locations entirely above the submatrix of the linear matrix to which they correspond;
      c. a means of multiplying the substitution vectors by each other and a first constant vector to yield a product vector;
      d. a means for adding the intermediate vector to the product vector and to a second constant vector to yield a sum vector;
      e. a means for permuting the sum vector with a permutation vector to yield an output vector in which each element of the sum vector appears once, but in a usually different position than in the sum vector;
      f. a means for generating an inverse linear matrix as the inverse of the linear matrix;
      g. a means for generating an inverse permutation as the inverse of the permutation vector;
   B. a means for hiding the private key by generating a public key at the receiver that represents the private key as a set of non-linear polynomial equations modulo the prime P by a means for symbolically solving the multiplicity of transformation steps in terms of the plain text variable vector and a means for reducing the set of non-linear polynomial equations to simplest terms;

C. a means for transmitting the public key to a sender via an insecure key channel;

D. a means for encrypting a plain text vector at the sender according to the public key by a means for substituting the plain text vector into the set of non-linear polynomial equations to produce a ciphertext;

E. a means for transmitting the ciphertext via an insecure communications channel to the receiver;

F. a means for decrypting the ciphertext at the receiver with the private key with a private key decryption means to produce the plain text thereby achieving secure communications; wherein the private key decryption means operates by reversing the multiplicity of transformation means of the private key in a reverse order to which they were applied and wherein reversing a transformation means comprises:

a. a means of reversing the permutation of an input vector using the inverse permutation to create an inverse permutation vector;

b. a means for starting from the top of the inverse linear matrix and considering each submatrix in turn;

c. a means of subtracting from the inverse permutation vector the sum of the product of the first constant vector and the multiplicity of substitutions of an output vector and the second constant vector to create an intermediate subvector, wherein operations are restricted to the range of the current submatrix;

d. a means of multiplying the intermediate subvector by the submatrix of the inverse linear matrix to create a corresponding subvector of the output vector;

e. a means of repeating the means for subtracting and the means for multiplying until all of the inverse linear matrix has been exhausted and the output vector contains the reversion of the transformation step.

4. An apparatus of claim 3 in which the prime, P, is chosen as P=2 whereby all of the means of multiplication, addition, and substraction modulo the prime reduce to means of performing logical AND, XOR, and XOR means respectively.

5. A method of communicating securely over an insecure communications channel in which authenticity of a message is provided including the steps of:

A. generating a private key of the receiver at a receiver that consists of a multiplicity of transformation steps of a plain text variable vector of fixed, but arbitrary length, wherein all steps are under the control of a random number source and wherein all operations of addition, subtraction, and multiplication are performed modulo a prime number, P, and wherein each transformation step comprises:

a. multiplying a linear matrix by an input vector to yield an intermediate vector, wherein the linear matrix contains its non-zero elements only in a multiplicity of submatrices along its principal diagonal and each submatrix possesses an inverse;

b. substituting the input vector in a multiplicity of substitution vectors in which a variable of the input vector may appear more than once or not at all and where each substitution vector location contains only variables of the input vector that lie in locations entirely above the submatrix of the linear matrix to which they correspond;

c. multiplying the substitution vectors by each other and a first constant vector to yield a product vector;

d. adding the intermediate vector to the product vector and to a second constant vector to yield a sum vector;

e. permuting the sum vector with a permutation vector to yield an output vector in which each element of the sum vector appears once, but in a usually different position than in the sum vector;

f. generating an inverse linear matrix as the inverse of the linear matrix;

g. generating an inverse permutation as the inverse of the permutation vector;

B. hiding the private key of the receiver by generating a public key of the receiver at the receiver that represents the private key of the receiver as a set of non-linear polynomial equations modulo the prime P by symbolically solving the multiplicity of transformation steps in terms of the plain text variable vector and reducing the set of non-linear polynomial equations to simplest terms;

C. transmitting the public key of the receiver to a sender via an insecure key channel;

D. generating a private key of the sender at the sender via steps that are the same as the generating of the private key of the receiver but using a different random number source;

E. hiding the private key of the sender by generating a public key of the sender at the sender that represents the private key of the sender as a set of non-linear polynomial equations modulo the prime P by symbolically solving the multiplicity of transformation steps in terms of the plain text variable vector and reducing the set of non-linear polynomial equations to simplest terms;

F. transmitting the public key of the sender to the receiver via the insecure key channel;

G. encrypting a plain text vector at the sender as a first step, according to the private key of the sender applied as the inverse of the multiplicity of transformation steps of the private key of the sender in reverse order to produce an intermediate ciphertext vector wherein reversing a transformation step consist of:

a. reversing the permutation of an input vector using the inverse permutation to create an inverse permutation vector;

b. starting from the top of the inverse linear matrix and considering each submatrix in turn;

c. subtracting from the inverse permutation vector the sum of the product of the first constant vector and the multiplicity of substitutions of an output vector and the second constant vector to create an intermediate subvector, wherein operations are restricted to the range of the current submatrix;

d. multiplying the intermediate subvector by the submatrix of the inverse linear matrix to create a corresponding subvector of the output vector;

e. repeating the steps G.c. and G.d. until all of the inverse linear matrix has been exhausted and the output vector contains the reversion of the transformation step;

H. completing the encryption of the plain text as a second step according to the public key of the receiver by substituting the intermediate ciphertext vector into the set of non-linear polynomial equations of the public key of the receiver to produce the ciphertext;
I. transmitting the ciphertext via an insecure communications channel to the receiver;
J. decrypting the ciphertext at the receiver as a first step, according to the private key of the receiver with a private key decryption process to produce the intermediate ciphertext vector; wherein the private key decryption process operates by reversing the multiplicity of transformation steps of the private key of the receiver in a reverse order to which they were applied and wherein reversing a transformation step comprises:
  a. reversing the permutation of an input vector using the inverse permutation to create an inverse permutation vector;
  b. starting from the top of the inverse linear matrix and considering each submatrix in turn;
  c. subtracting from the inverse permutation vector the sum of the product of the first constant vector and the multiplicity of substitutions of an output vector and the second constant vector to create an intermediate subvector, wherein operations are restricted to the range of the current submatrix;
  d. multiplying the intermediate subvector by the submatrix of the inverse linear matrix to create a corresponding subvector of the output vector;
  e. repeating the steps J.c. and J.d. until all of the inverse linear matrix has been exhausted and the output vector contains the reversion of the transformation step; and as a second step,
K. completing the decryption of the ciphertext according to the public key of the sender by substituting the intermediate ciphertext vector into the set of non-linear polynomial equations of the public key of the sender to produce the plain text and thereby achieving secure communications since only the receiver possessing the private key of the receiver can recover the intermediate ciphertext vector and authenticating the message since only the sender possessing the private key of the sender can generate the intermediate ciphertext vector that is decrypted to the plain text with the public key of the sender.

6. A method of claim 5 in which the prime, P, is chosen as $P=2$ whereby all of the operations of multiplication, addition, and subtraction modulo the prime reduce to logical AND, XOR, and XOR operations respectively.

7. An apparatus for communicating securely over an insecure communications channel in which authenticity of a message is provided and comprising:
A. a means for generating a private key of the receiver at a receiver that consists of a multiplicity of transformation means of a plain text variable vector of fixed, but arbitrary length, wherein all means are under the control of a random number source means and wherein all means of addition, subtraction, and multiplication are performed modulo a prime number, P, and wherein each transformation means comprises:
  a. a means of multiplying a linear matrix by an input vector to yield an intermediate vector, wherein the linear matrix contains its non-zero elements only in a multiplicity of submatrices along its principal diagonal and each submatrix possesses an inverse;
  b. a means for substituting the input vector in a multiplicity of substitution vectors in which a variable of the input vector may appear more than once or not at all and where each substitution vector location contains only variables of the input vector that lie in locations entirely above the submatrix of the linear matrix to which they correspond;
  c. a means of multiplying the substitution vectors by each other and a first constant vector to yield a product vector;
  d. a means for adding the intermediate vector to the product vector and to a second constant vector to yield a sum vector;
  e. a means for permuting the sum vector with a permutation vector to yield an output vector in which each element of the sum vector appears once, but in a usually different position than in the sum vector;
  f. a means of generating an inverse linear matrix as the inverse of the linear matrix;
  g. a means of generating an inverse permutation as the inverse of the permutation vector;
B. a means for hiding the private key of the receiver by generating a public key of the receiver at the receiver that represents the private key of the receiver as a set of non-linear polynomial equations modulo the prime P by a means for symbolically solving the multiplicity of transformation means in terms of the plain text variable vector and a means for reducing the set of non-linear polynomial equations to simplest terms;
C. a means for transmitting the public key of the receiver to a sender via an insecure key channel;
D. a means for generating a private key of the sender at the sender via means that are the same as the generating of the private key of the receiver but using a different random number source means;
E. a means of hiding the private key of the sender by generating a public key of the sender at the sender that represents the private key of the sender as a set of non-linear polynomial equations modulo the prime P by a means for symbolically solving the multiplicity of transformation steps in terms of the plain text variable vector and a means of reducing the set of non-linear polynomial equations to simplest terms;
F. a means for transmitting the public key of the sender to the receiver via the insecure key channel;
G. a means for encrypting a plain text vector at the sender by a first means, according to the private key of the sender applied as the inverse of the multiplicity of transformation means of the private key of the sender in reverse order to produce an intermediate ciphertext vector wherein reversing a transformation means comprises:
  a. a means of reversing the permutation of an input vector using the inverse permutation to create an inverse permutation vector;
  b. a means for starting from the top of the inverse linear matrix and considering each submatrix in turn;
  c. a means for subtracting from the inverse permutation vector the sum of the product of the first constant vector and the multiplicity of substitutions of an output vector and the second constant vector to create an intermediate subvector, wherein operations are restricted to the range of the current submatrix;

d. a means for multiplying the intermediate subvector by the submatrix of the inverse linear matrix to create a corresponding subvector of the output vector;

e. wherein the subtracting of the means for subtracting and the multiplying of the means for multiplying are repeated until all of the inverse linear matrix has been exhausted and the output vector contains the reversion of the transformation step;

H. a means of completing the encryption of the plain text by a second means according to the public key of the receiver with a means for substituting the intermediate ciphertext vector into the set of non-linear polynomial equations of the public key of the receiver to produce the ciphertext;

I. a means for transmitting the ciphertext via an insecure communications channel to the receiver;

J. a means for decrypting the ciphertext at the receiver as a third means, according to the private key of the receiver with a private key decryption process to produce the intermediate ciphertext vector; wherein the private key decryption process operates with a means for reversing the multiplicity of transformation means of the private key of the receiver in a reverse order to which they were applied and wherein reversing a transformation means comprises:

a. a means of reversing the permutation of an input vector using the inverse permutation to create an inverse permutation vector;

b. a means for starting from the top of the inverse linear matrix and considering each submatrix in turn;

c. a means for subtracting from the inverse permutation vector the sum of the product of the first constant vector and the multiplicity of substitutions of an output vector and the second constant vector to create an intermediate subvector, wherein operations are restricted to the range of the current submatrix;

d. a means for multiplying the intermediate subvector by the submatrix of the inverse linear matrix to create a corresponding subvector of the output vector;

e. a means for repeating the means for subtracting and the means for multiplying until all of the inverse linear matrix has been exhausted and the output vector contains the reversion of the transformation step; and as a fourth means, K. a means for completing the decryption of the ciphertext according to the public key of the sender with a means for substituting the intermediate ciphertext vector into the set of non-linear polynomial equations of the public key of the sender to produce the plain text and thereby achieving secure communications since only the receiver possessing the private key of the receiver can recover the intermediate ciphertext vector and authenticating the message since only the sender possessing the private key of the sender can generate the intermediate ciphertext vector that is decrypted to the plain text with the public key of the sender.

8. An apparatus of claim 7 in which the prime, P, is chosen as $P=2$ whereby all of the means of multiplications, addition, and subtraction modulo the prime reduce to means of performing logical AND, XOR, and XOR means respectively.

9. A method for generating private and public keys for use in communications systems that assure secure communications or secure and authenticated communications over an insecure channel that comprises:

A. creating a reversible private key transformation that includes a multiplicity of transformation steps performed solely by arithmetic operations of addition, subtraction, and multiplication modulo a prime, P, where each transformation step comprises:

a. substituting in a multiplicity of substitution vectors a plain text vector, when the substitution is of the plain text vector, and an intermediate vector, when the substitution is of any one of a plurality of intermediate vectors;

b. creating a multiplicity of linear matrix vectors as the products of a multiplicity of linear matrices and the plain text vector, when the multiplication is by the plain text vector, and any one of said intermediate vectors, when the multiplication is by said any one of said plurality of intermediate vectors;

c. permuting the plain text vector, when the permutation is of the plain text vector, and any one of said intermediate vectors, when the permutation is of any one of said plurality of intermediate vectors, in a multiplicity of permutation vectors;

d. combining the substitution vectors, the linear matrix vectors, and the permutation vectors using the operations of addition, subtraction, and multiplication of elements of said vectors in a manner that allows the recovery of said any one of said plurality of intermediate vectors and the plain text vector;

B. hiding the private key transformation in a public key by representing the private key transformation as a set of non-linear polynomial equations modulo the prime P by symbolically solving the multiplicity of transformation steps in terms of the plain text variable vector and reducing the set of non-linear equations to a minimum sum of products canonic form.

10. A method of claim 9 in which the prime, P, is chosen as $P=2$ whereby all of the operations of multiplication, addition, and subtraction modulo the prime reduce to logical AND, XOR, and XOR operations respectively.

11. An apparatus generating private and public keys for use in communications systems that assure secure communications or secure and authenticated communications over an insecure channel that comprises:

A. a means for creating a reversible private key transformation that includes a multiplicity of transformation means performed solely by arithmetic means of addition, subtraction, and multiplication modulo a prime, P, where each transformation means comprises:

a. a means for substituting in a multiplicity of substitution vectors a plain text vector, when the substitution is of the plain text vector, and an intermediate vector, when the substitution is of any one of a plurality of intermediate vectors;

b. a means for creating a multiplicity of linear matrix vectors as the products of a multiplicity of linear matrices and the plain text vector, when the multiplication is by the plain text vector, and any one of said intermediate vectors, when the multiplication is by said any one of said plurality of intermediate vectors;

c. a means of permuting the plain text vector, when the permutation is of the plain text vector, and any one of said intermediate vectors, when the permutation is of any one of said intermediate vectors, in a multiplicity of permutation vectors;

d. a means of combining the substitution vectors, the linear matrix vectors, and the permutation vectors using the operations of addition, subtraction, and multiplication of elements of said vectors in a manner that allows the recovery of said any one of said plurality of intermediate vectors and the plain text vector;

B. a means for hiding the private key transformation in a public key by representing the private key transformation as a set of non-linear polynomial equations modulo the prime P with a means for symbolically solving the multiplicity of transformation means in terms of the plain text variable vector and a means for reducing the set of non-linear equations to a minimum sum of products canonic form.

12. An apparatus of claim 11 in which the prime, P, is chosen as $P=2$ whereby all of the means of multiplication, addition, and subtraction modulo the prime reduce to means of performing logical AND, XOR, and XOR means respectively.

* * * * *